US012628814B2

(12) United States Patent
Rubio Carrera et al.

(10) Patent No.: US 12,628,814 B2
(45) Date of Patent: May 19, 2026

(54) SYSTEM FOR CONTROLLING ANIMAL PESTS

(71) Applicants:Ignacio Rubio Carrera, Tudela (ES); Carlos Rubio Carrera, Tudela (ES); José Javier Rubio Carrera, Tudela (ES)

(72) Inventors: Ignacio Rubio Carrera, Tudela (ES); Carlos Rubio Carrera, Tudela (ES); José Javier Rubio Carrera, Tudela (ES)

( * ) Notice: Subject to any disclaimer, the term of this patent is extended or adjusted under 35 U.S.C. 154(b) by 0 days.

(21) Appl. No.: 18/867,218

(22) PCT Filed: May 16, 2023

(86) PCT No.: PCT/ES2023/070312
§ 371 (c)(1),
(2) Date: Nov. 19, 2024

(87) PCT Pub. No.: WO2023/222936
PCT Pub. Date: Nov. 23, 2023

(65) Prior Publication Data
US 2025/0318516 A1 Oct. 16, 2025

(30) Foreign Application Priority Data
May 20, 2022 (ES) ................................ ES202230431

(51) Int. Cl.
*A01M 25/00* (2006.01)
*A01M 1/10* (2006.01)
(Continued)

(52) U.S. Cl.
CPC ............ *A01M 25/004* (2013.01); *A01M 1/10* (2013.01); *A01M 23/005* (2013.01); *A01M 23/16* (2013.01); *E01C 11/222* (2013.01)

(58) Field of Classification Search
CPC .... A01M 25/004; A01M 1/10; A01M 23/005; A01M 23/16
(Continued)

(56) References Cited

U.S. PATENT DOCUMENTS 2,615,526 A 10/1952 Lane
2,962,836 A * 12/1960 Hughes ............... A01M 25/004
43/58

(Continued)

FOREIGN PATENT DOCUMENTS

BR MU8801247 U2 1/2011
ES 1068628 U 11/2008
WO 2019206627 A1 10/2019

OTHER PUBLICATIONS

International Search Report, mailed on Jun. 2, 2023, issued for the corresponding International Application No. International Application No. PCT/ES2023/070312, 7 pages, with English translation.

*Primary Examiner* — Zoe Tam Tran
(74) *Attorney, Agent, or Firm* — LUCAS & MERCANTI, LLP

(57) ABSTRACT
A system for controlling animal pests that is to be used on roads through a module forming part of a sidewalk that has at least one entry for animals to access an inner chamber of the module, this chamber being configured to contain poison, a placebo and/or traps for the animal pests to be treated.

7 Claims, 4 Drawing Sheets

(51) Int. Cl.
  A01M 23/00 (2006.01)
  A01M 23/16 (2006.01)
  E01C 11/22 (2006.01)

(58) Field of Classification Search
  USPC ...................................................... 43/58, 131
  See application file for complete search history.

(56) References Cited

U.S. PATENT DOCUMENTS

| | | | | |
|---|---|---|---|---|
| 4,648,201 A * | 3/1987 | Sherman | ............. | A01M 25/004 |
| | | | | 43/131 |
| 4,658,536 A * | 4/1987 | Baker | ................. | A01M 25/004 |
| | | | | 43/131 |
| 5,927,000 A * | 7/1999 | Bordes, Jr. | ............. | A01M 1/24 |
| | | | | 43/132.1 |
| 6,453,603 B1 * | 9/2002 | Baker | ................. | A01M 1/2011 |
| | | | | 43/132.1 |
| 8,793,929 B1 * | 8/2014 | Walsh | ................. | A01M 25/004 |
| | | | | 43/131 |
| 2005/0151653 A1 * | 7/2005 | Chan | ................... | A01M 31/002 |
| | | | | 340/573.2 |
| 2005/0235553 A1 * | 10/2005 | Rail | ....................... | A01M 23/38 |
| | | | | 43/58 |
| 2006/0123693 A1 * | 6/2006 | Muller | ................ | A01M 31/002 |
| | | | | 43/99 |
| 2006/0156617 A1 * | 7/2006 | Hale | ....................... | A01M 23/30 |
| | | | | 43/81 |
| 2010/0319238 A1 * | 12/2010 | Cink | ................... | A01M 25/004 |
| | | | | 43/58 |
| 2011/0072709 A1 * | 3/2011 | Patterson | .............. | A01M 23/30 |
| | | | | 43/131 |
| 2012/0174469 A1 * | 7/2012 | Gardner | ................ | A01M 23/08 |
| | | | | 43/60 |
| 2013/0333273 A1 * | 12/2013 | Esculier | .............. | A01M 23/005 |
| | | | | 43/131 |
| 2014/0059920 A1 * | 3/2014 | Messina | ................... | A01G 9/04 |
| | | | | 43/131 |
| 2019/0124913 A1 * | 5/2019 | Power | ................. | A01M 31/002 |
| 2022/0287292 A1 * | 9/2022 | Morales | .............. | A01M 25/004 |

* cited by examiner

SYSTEM FOR CONTROLLING ANIMAL PESTS

CROSS-REFERENCE TO RELATED APPLICATION

This Application is a 371 of PCT/ES2023/070312 filed on May 16, 2023, which claims priority of Spanish Application No. P202230431 filed May 20, 2022, each of which are incorporated herein by reference.

TECHNICAL FIELD

The problem of animal pests, such as insects or rodents, on roads or in private enclosures is widespread and needs to be addressed to prevent the spread of diseases and attacks by said pests on people, plants or animals, as well as other types of problems caused by unchecked pest growth.

STATE OF THE ART

The problem of pests on roads is well known and can arise due to various reasons, including, for example, problems in the sewage system or accumulated dirt in certain places. All this favours the emergence of species and their unchecked population growth, which is undesirable and must be prevented or effectively reduced.

The appearance of pests on roads or in private premises can cause a wide variety of problems for the health of people, animals or plants and damage to furniture. For example, the spread of rats can lead to the spread of diseases via transmission on their part, as well as attacks on people or other animals. Rats may also wreak havoc in gardens or parks in their search for food.

Some of the most important diseases that can be transmitted by pests are leptospirosis, for example via rodent urine, and hantavirus pulmonary syndrome, both of which are potentially lethal.

As they live in the sewage system, they enter the road through the scuppers and from there to plots of land and abandoned houses where they establish their new burrows, from where they make nocturnal forays in search of food to other plots and areas, or to organic waste containers.

Another example of pests can be small insects such as cockroaches or mosquitoes, or similar. These insects can transmit diseases to humans or animals through their bites or stings.

Similarly, they may create colonies that create some danger to the structures in which they nest. Similarly, some insects can cause serious attacks on vegetation due to their nourishment needs, and some insects may even feed on wood that is part of the furniture. These insects can spread rapidly if rapid action is not taken to control unchecked growth.

Turkestan cockroaches are an example of an insect that resides in and gains access from the sewage system to roads. In addition to the problems described above, their droppings are allergenic, especially in asthmatics, and can transmit diseases such as dysentery, gastroenteritis, typhoid fever and poliomyelitis.

Traditionally, poisons in pill form have been placed in places frequented by pests. These poisons can be fast-killing or slow-killing. The slow-killing poison allows the species to move around and not identify where they have ingested the poison. At present, only those which are delayed, anti-coagulants that create internal bleeding, or with cholecalciferol, recently approved as an alternative, are authorised.

Currently, they are the most popular solutions as they can lead to the extermination of the pest and not just the death of a single individual. However, many legislations have prohibited the placement of poisons on directly accessible surfaces because they can be ingested by other animals or be degraded and dissolved, reaching the subsoil.

The possibility of the poison dissolving in the water occurs with the bait placed in the sewage system manholes, where, although environmentally responsible companies attach the bait with a towrope so that the poison is not carried away by the water, it can be totally or partially released and contaminate the water. Sometimes, the towropes also disappear, either due to the interaction of the pests during their feeding or due to the dragging of the water in the presence of high flows.

Odours from refuse containers, which are sometimes on top of or near sewer grates, cause pests to come up from the underground through grates, or scuppers. The same applies if there is overcrowding or if there are river floods and heavy rains.

Earthworks created due to excavations for car parks, buildings or streets also cause them to gain access to the surface. Confinement and closure of catering establishments leads to increasing forays into establishments due to the decrease in noise, light and food at night because the catering establishments are closed and food is not poured down the drains.

As an alternative to the use of poison, food is also used as bait and long-lasting adhesives that trap pests when they come for food. To do this, a piece of food is placed in the centre and the sticker is placed around the same, trapping the pests that move towards the food. Another alternative is the use of sticky boards that could be placed on a surface, with stickers containing a food pheromone as an attractant or the placement of a placebo, and the bait could be replaced by poison when presence is detected in a certain area.

The use of poisons has the problem that it cannot be directly exposed because other animals such as pets or even children may be attracted thereto and ingest the same. In addition, it can be a hazard as it can degrade causing animals not to die or it can dissolve and contaminate land or water. Therefore, some legislations forbid their direct use on surfaces.

Some known solutions are small cages or traps that are placed in strategic locations where animals or insects enter attracted by an odour or food and are trapped. The most typical form of attraction is through the use of scents so that pests are attracted in search of a very strong odour. The problem with these traps is that animals may come to associate these points with danger so that they avoid them. In addition, trapped prey needs to be removed or they will starve to death, causing decomposition and masking the attractive odour.

Pests of caliphora flies, which lay eggs in decaying flesh, could emerge if carcasses are not removed from public spaces. Caliphora flies, for example, are blowflies that create a nuisance in people's daily lives as adults. They are vectors of important diseases such as myiasis, dysentery, etc. These insects are associated with the transmission of a large number of viral and bacterial diseases.

A well-known solution is Chinese patent CN205431691 in which a cardboard box is used to make a cage, especially for cockroaches, with multiple entries to allure them to enter and where the floor inside is coated with a special insect glue that traps them. This device can be mounted on the place where it is to be arranged, and once it has fulfilled its function, it can be easily removed. This trap is made of cardboard or plastic so that it is easy to handle as it performs a one-off function and once completed, it must be replaced with a new one.

In view of the above, it has been found that the most common method is the use of traps or boxes in which the poison is placed, or glue is used, in a closed manner so that only the animals to be exterminated can enter. The major problem with these methods is that they require the traps to be placed on roads or in places where the pests to be treated abound. This causes a visual impact and the traps can be moved or taken to other sites by anyone.

OBJECT OF THE INVENTION

The subject of the invention is a system for controlling animal pests that is to be used on roads comprising a module forming part of the sidewalk and configured to contain different devices therein for detecting, monitoring, capturing or eliminating different pests of, for example, rodents and insects. The module is integrated into the sidewalk below the surface thereof, e.g. on sidewalks at the same level as the roadway, or alternatively it could form part of the kerb of the sidewalk. Therefore, only the entries to the module, through which the animals to be treated will enter, will be visible on the sidewalk. Therefore, the module comprises at least one entry for animals to access an inner chamber of said module.

The inner chamber may be configured to contain the deposited poison to be ingested by the animal pests to be treated. Preferably, the poison is delayed so that the species do not die in the device, so that the species can access the inner chamber to ingest the poison and then return to their nest or colony and die there. The death of the animal therefore occurs days after ingestion of the poison, which does not create suspicion in the colony. If traps are placed too close to the colony or nest, this may cause the animal pest to associate the trap with death, causing the animals to disperse and spread the pest to other sites, so it is important that they are placed in a location that cannot be associated with death. This encourages other animals to come and eat the toxic bait as well, following the traces they leave with their scent and urine.

As an alternative to the use of poison or placebo, other mechanical trapping devices, sticky boards, placebo traps, etc., could be introduced in the modules and the use of biocides could be dispensed with. The aim of all these systems is to control animal pests by monitoring, elimination or trapping.

The use of these alternatives to poison could greatly reduce the use of biocides currently in use, avoiding the pollution and risks they cause, as well as having the streets permanently under surveillance simply by monitoring the control stations. Said monitoring can be achieved simply by means of periodic inspections if the placebo has been ingested, or if animals appear in the traps.

This system provides an aesthetic integration of the control system on the road so that the placement of the trap does not cause an additional visual impact to that of the animal pest. As the system is integrated into a module that forms part of the kerb of the sidewalk, it can be adapted or painted to make it even more discreet and such that it can be seen as part of the kerb of the sidewalk rather than the pest control system that it is.

Another advantage of the sidewalk-integrated modules is to avoid their initial rejection of objects, as rats are neophobic, and by means of their integration, they would not reject the modules, as they would not generate distrust.

When the module is integrated into the kerb, it preferably has at least one entry at the side of the kerb. The top of the module can be covered in the same way as the rest of the sidewalk, e.g. by means of paving stones, causing the animal pest control system to not be visible from the top.

In order to facilitate the access of animal pests to the interior, the entry or entries are also preferably at the same level as the roadway and of a size appropriate to the species to be treated. This encourages animal entry, as many pests such as rodents move close to the kerb for protection, making it easy for them to follow the trail that attracts them to the poison, mechanical traps, clamps, sticky boards or placebo located in the inner chamber of the module and enter through the side entry of the module on the side of the kerb.

Optionally, the entry to the module may comprise two or more entries to the chamber from two points on the kerbside and/or the top surface. This option would favour the existence of an inflow and outflow and a higher probability of animal pests entering the interior, which increases its effectiveness. An example with a plurality of entries could be the placement of the module on a corner of the kerb, whereby, for example, two entries are lateral and correspond to one side of the kerb and another entry is on the other side of the kerb.

An inner chamber is understood as an enclosed space inside the module that is protected on all sides. Said inner chamber has at least one entry from the outside, which can be directly from the entry, such as an opening with the module being an empty box, or indirectly through a duct leading from the outside to the inner chamber located inside the module.

In order to be able to carry out maintenance work, such as depositing poison or placebo, or changing mechanical traps and clamps, or replacing sticky boards and/or removing dead species in the inner chamber, it is provided that the module includes a direct access to the inside of the inner chamber. Said access is preferably blocked for security so that the inner chamber is closed, e.g. by a gate or a cover. This access can be at the top, allowing easy access to the interior and its maintenance from the sidewalk. Said gate or cover may be protected by a lockable latch to restrict access to prevent members of the public from gaining access and coming into contact with the poison, mechanical traps, clamps, sticky boards, placebo or the animal pest. This can be either a hinged gate or a cover that can be detached from the module.

Alternatively, the access can be on the side of the module, so that the module can be covered at the top with paving stones or tiles, just like the rest of the sidewalk. This embodiment ensures that the module can be attached and integrated into the sidewalk in a more complete manner. Its side access may comprise a gate or cover and also allows the operator to carry out the necessary maintenance work on the system in a restricted manner by means of a lock.

The module may have an inner chamber in the form of a removable box. This alternative does not require the use of a gate, so the removable box could be fitted with a lock to restrict its use. The removable box can be pulled out from the side of the kerb. In another embodiment, said box may also be removable from the top.

Preferably, the inner chamber of the module is arranged at a height above the roadway. This difference in level means that in the event of rain or water on the roadway, water does not enter the inner chamber, which would cause the poison, mechanical traps, clamps, sticky boards or placebo to deteriorate. The single-entry modules would be intended for sloping sidewalks, which would prevent rainfall from flooding the chamber from the entry at the top of the module, which, being downhill, would facilitate flooding. Similarly, it prevents the entry of dirt or windblown debris on the roadway that may deter species from entering or even mask or render useless the poison, mechanical traps, clamps, sticky boards or placebo deposited.

According to one design option, the bait in the case of poison or placebo use is not placed on the floor of the inner module or chamber, but is threaded into a retaining bait holder, e.g. in the form of a rod. The bait holder prevents rodents from moving the bait, forcing them to ingest the same in the module where they feel protected, thus avoiding the risk of external contamination.

The modules can be geolocated for monitoring and have sensors or cameras that allow real-time monitoring of each module.

The entry to the inner chamber to bridge said difference in level can be made, for example, by means of a ramp. Alternatively, the side entry to the inner chamber may be formed by small steps, ladders or by bars by means of which the animals can climb up to said inner chamber.

Preferably, this system for controlling animal pests targets rodents, more specifically mice or rats. It would also be valid for insects such as cockroaches or mosquitoes. In each particular case of species to be treated, the entries as well as the poison, mechanical traps, clamps, sticky boards or placebo to be placed in the inner chamber could be adapted.

For all these reasons, this solution provides a system that is integrated on the road for controlling animal pests in a safe and controlled manner. It allows the maintenance of the module in a simple manner, as well as the control of the animal pest and its disproportionate growth. Visually, it does not impact on the daily life of the members of the public and does its job in an unobtrusive but effective manner. The module is integrated and attached to the sidewalk, making this system safer for members of the public and preventing theft.

DETAILED DESCRIPTION OF THE INVENTION

The figures correspond to non-limiting exemplary embodiments and there may be variants in the conformation of the system as long as the essence of the system, which is to have a system for controlling animal pests with a module (1) that is installed on a sidewalk, is not altered. The module (1) comprises an inner chamber (4), where poison (10), mechanical traps, clamps, sticky boards or placebo, as appropriate, are placed, and to which the animals have access through at least one entry (2) which is arranged in the same plane as the side of the kerb or on the surface of the sidewalk.

Figure 1:
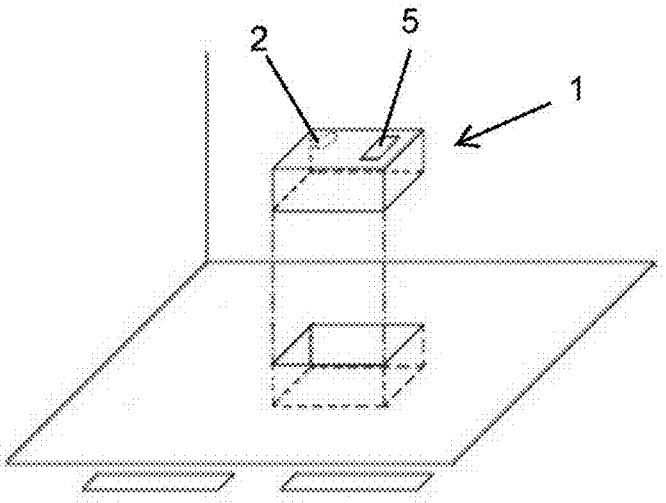
FIG. 1 shows a schematic view of the sidewalk with a recess for placing the module of the pest control system of the invention, when the sidewalk is at the same level as the roadway.
Figure 2:
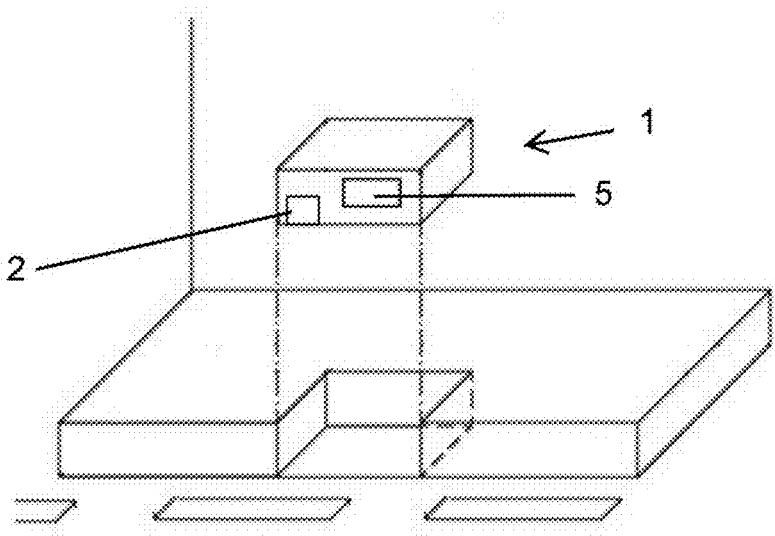
FIG. 2 shows a schematic view of a sidewalk with a kerb having a recess for placing the module of the pest control system of the invention on the kerb.

FIGS. 1 and 2 show the installation of the module (1) for its integration into a sidewalk of a road, so that, in order to integrate and attach the module (1), a free space can be left for the construction of the sidewalk. It could be installed before, during or after the construction of the sidewalk, so it is very easy to install on existing sidewalks by simply making a cut having the size of the module (1). The attachment of this module (1) can be permanent or temporary depending on the circumstances and requirements, using means of attachment such as screws, adhesives or cementing. The entry (2) of said module (1) is always positioned outwards, so that it is located in the plane of the side of the kerb, if there is a kerb, or in the upper plane, if there is no kerb. For example, the module (1) could be placed close to facades or in discreet locations, where only the entries (2) would be visible on the road.

The module (1) shall preferably be installed such that it is integrated into the sidewalk, with the side of the module (1) on the same plane as the side of the kerb and with the top of the module (1) on the same plane as the sidewalk where people pass. Alternatively, the module (1) could be positioned below the surface of the sidewalk as long as the upper portion is flush with the sidewalk. In this way, the module (1) does not protrude with respect to the rest of the sidewalk, so that the system is fully integrated into the sidewalk.

Figure 3:
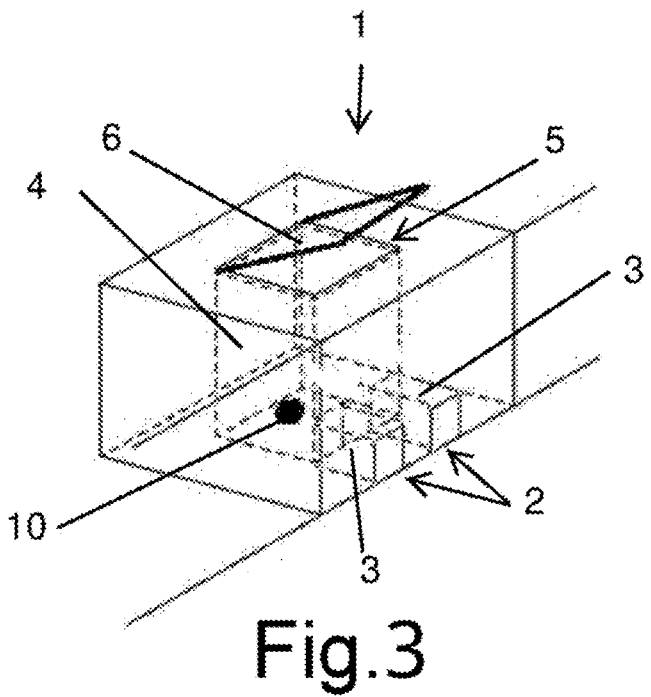
FIG. 3 shows a schematic perspective view of a module with an upper access to an inner chamber in the form of a folding cover.
Figure 4:
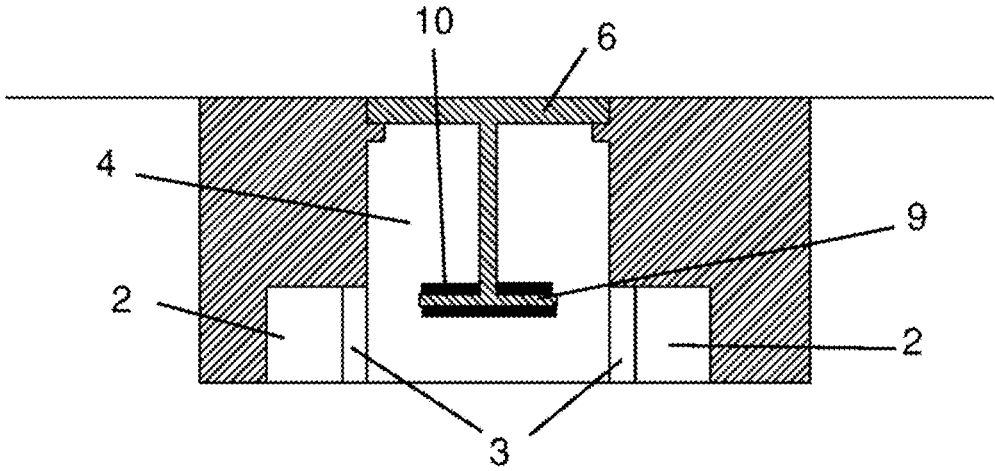
FIG. 4 shows a schematic cross-sectional view of a module with an upper access, with a cover and side entries to the inner chamber.

FIG. 3 shows a perspective view of an embodiment of the invention, and FIG. 4 shows a corresponding section, in which the module (1) has an inner chamber (4) with an upper access (5) and two entries (2) at the side of the kerb. The inner chamber (4) can be accessed for depositing the poison (10) via the upper access (5), in this case in the form of a cover or gate (6). The entries (2), in this case two, are located on the side of the module (1) and in the same plane as the side of the kerb. These entries (2) lead to ducts (3) that connect the outside of the module with the inner chamber (4), in this case at the same level as the roadway. This could be made either in solid concrete, by casting a kerbstone or as a structural block.

According to the practical embodiment of the figures, there may be a bait holder (9) in the inner chamber (4), shaped as a rod, in which the poison (10) is threaded to prevent the animals from being able to remove the poison (10) from said inner chamber (4). The height of the bait holder (9) must be suitable for the animals to be able to eat same without effort. The bait holder (9) can be fitted to the walls of the inner chamber (4) by means of hooks or be joined to the cover (6) itself.

Figure 5:
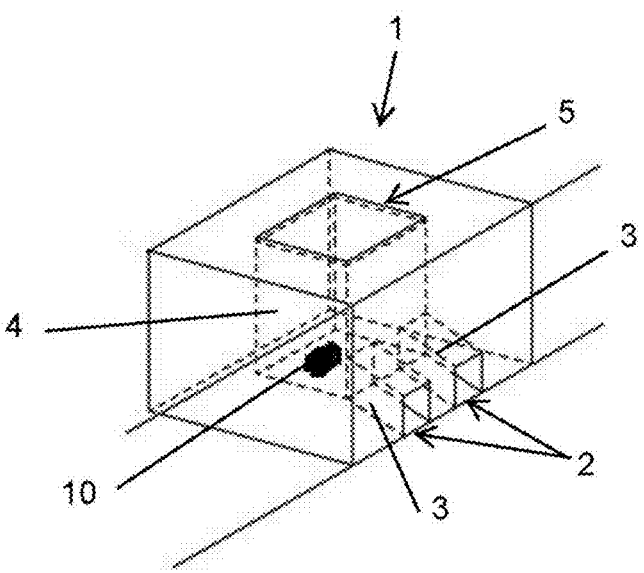
FIG. 5 shows a schematic perspective view of a module with an upper access to an inner chamber located at a height above the roadway.
Figure 6:
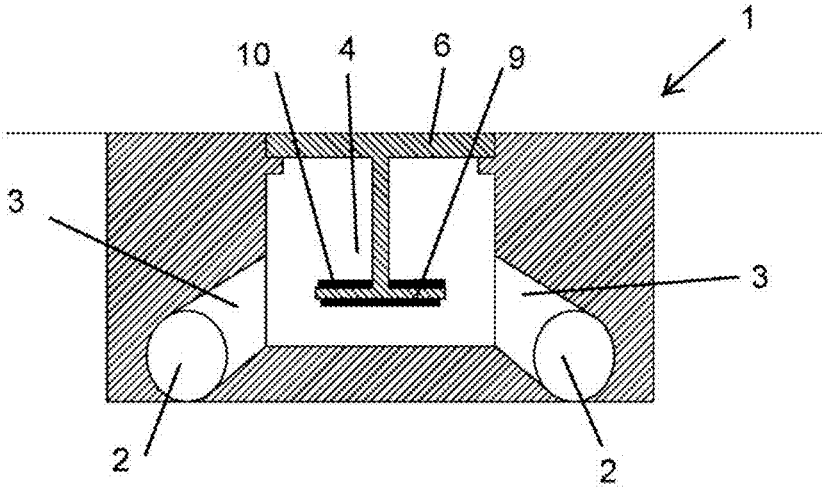
FIG. 6 shows a schematic cross-sectional view of the exemplary embodiment in FIG. 5 with the side entries to the inner chamber.

FIG. 5 and FIG. 6 shows an embodiment similar to that shown in FIGS. 3 and 4, but in this case with the inner chamber (4) at a height with respect to the roadway, the entry opening (2) being on the side of the module (1). The height of the inner chamber (4) prevents flooding when water covers the roadway, at least up to a certain level, thus protecting the poison (10) from being washed away or having its properties and/or characteristics impaired. The entry (2) in this embodiment has a duct (3), which has the shape of a rising ramp from the roadway to the inner chamber (4). Alternatively, stairs could be used to bridge the difference in level or other similar means.

Figure 7:
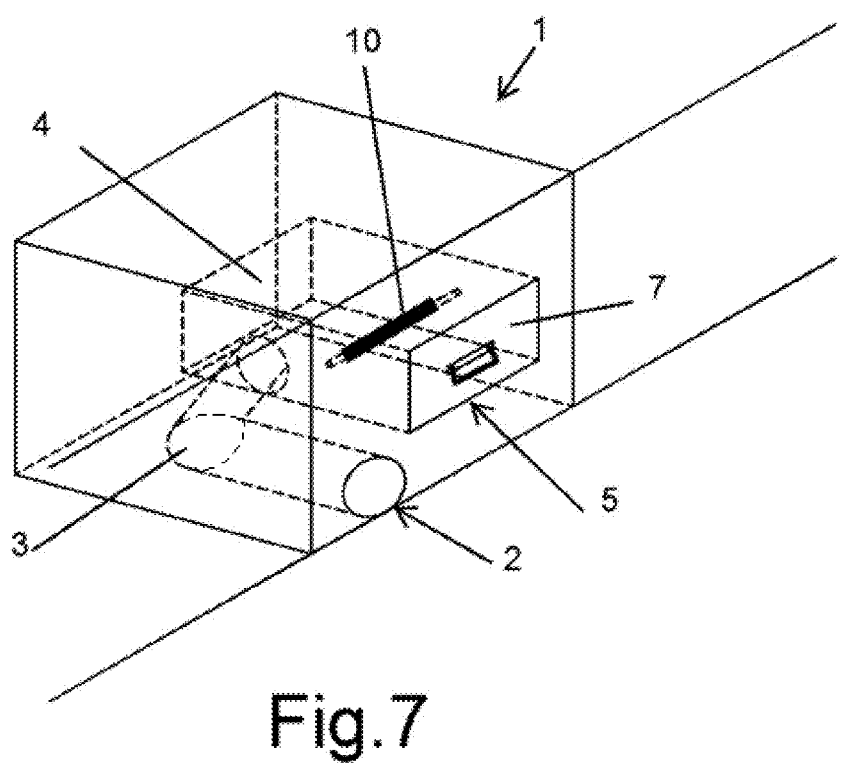
FIG. 7 shows a schematic perspective view of a module with a chamber in the shape of a removable box and with the inner chamber in height.
Figure 8:
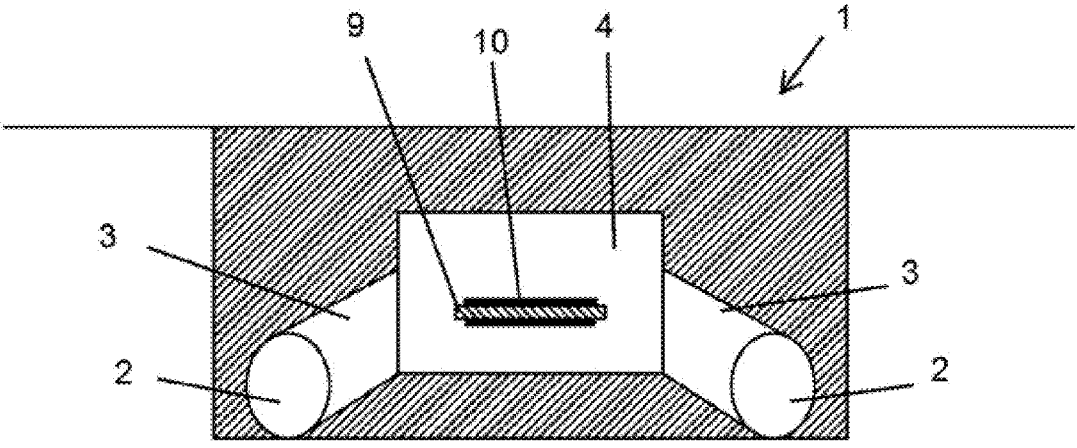
FIG. 8 shows a schematic cross-sectional view of the embodiment of FIG. 7.

FIG. 7 and FIG. 8 show another alternative embodiment where the inner chamber (4) has an access (5) on the side of the module (1), specifically, on the same side where the entry (2) is located. This access (5) may also have a cover or gate (6) as in the previous embodiments. This embodiment does not require the use of the upper portion of the module (1), so it can be covered in the same way as the rest of the sidewalk.

The entry (2) may have a duct (3) positioned, for example, parallel to the inner chamber (4), thus allowing the inner chamber (4) to extend to the side where the access (5) is located. The access (5) is in the form of a removable box (7) forming the inner chamber (4), so that its extraction corresponds to the access (5), whether or not the gate (6) can be dispensed with. In this case, the duct (3) for entering the inner chamber (4) can be seen schematically represented in a tubular form, which can be a continuous ramp or any other type of embodiment such as stairs that bridges the difference in level towards the inner chamber (4) but remains fixed, allowing the inner chamber (4) to be removed in the form of a removable box (7).

The module (1) can be made of various shapes and materials. Mainly, the module (1) can be made, for example, in a mould with concrete, leaving inside the module (1) the entry (2) with the at least one access (5) to an inner chamber (4). Once the concrete has set, the access (5) cover (6) is added to the inner chamber (4). In addition, it can be painted or covered with the paving stones of the street, as long as the access (5) to the inner chamber (4) remains free.

Alternatively, the module (1) can be a kerbside where the entries (2) and inner chamber (4) are emptied. It would be necessary to place the access (5) and/or removable box (7) on this hollowed out kerb to form the inner chamber (4).

Another option would be a module (1) made of a metal structure covered with a layer of the same materials as the rest of the sidewalk. In this way, the module (1) would be lighter and would support the weight of pedestrians, making it easier to assemble and anchor. Moreover, the interior structure would allow for greater adaptability to different species that may cause pests and require to be treated. Preferably, in this case, there would be a removable box (7) with side access (5) in which the removable box (7) has both the inner chamber (4) and the entry (2) to the inner chamber, including the duct (3) if needed.

Alternatively, this module (1) could be cemented and have a bait holder (9) with a cover (6) to be able to remove same by means of a key, from the roadway for greater safety. The gate (6) may have the rod forming the bait holder (9) on the underside, where the bait with the poison (10) is attached. Another option is that the bait holder (9) is integrated with the removable box (7) and both can be removed at once.

The examples shown are non-limiting practical implementations and there may be combinations thereof or other examples that allow access to an inner chamber (4) that is completely enclosed for the protection of the poison (10).

The figures show the use of poison (10) as a practical exemplary embodiment of the invention, but it would be equivalent to any of the other systems mentioned, i.e. the use of mechanical traps, clamps or sticky boards. The inner chamber (4) houses in each case the pest control, detection or elimination system, depending on the device used.

The invention claimed is:

1. A system for controlling animal pests used on roads comprising a module forming part of a walking surface of a sidewalk, the module having at least one entry for animals to access an inner chamber of said module, the chamber being configured to contain poison, a placebo and/or traps for the animal pests to be treated.

2. The system for controlling animal pests according to claim 1, wherein the sidewalk has a kerb and the module forms part of the kerb of the sidewalk.

3. The system for controlling animal pests according to claim 2, wherein the at least one entry is located on the side of the kerb.

4. The system for controlling animal pests according to claim 1, wherein the module has a side and/or upper access through which the inner chamber can be accessed.

5. The system for controlling animal pests according to claim 1, wherein the inner chamber is formed by a removable box, which is removable from the side and/or top of the sidewalk.

6. The system for controlling animal pests according to claim 2, wherein the inner chamber is located at a height with respect to the level of the roadway.

7. The system for controlling animal pests according to claim 1, wherein the module includes a bait holder for retaining the poison or placebo in the inner chamber.

* * * * *